March 31, 1953 — D. CUVILLIER — 2,632,974
JUMP BITE TRAP

Filed May 17, 1950 — 2 SHEETS—SHEET 1

INVENTOR.
Dennis Curvillier
BY Victor J. Evans & Co.
ATTORNEYS

March 31, 1953 D. CUVILLIER 2,632,974
JUMP BITE TRAP
Filed May 17, 1950 2 SHEETS—SHEET 2

INVENTOR.
Dennis Curvillier
BY Victor J. Evans & Co.
ATTORNEYS

Patented Mar. 31, 1953

2,632,974

UNITED STATES PATENT OFFICE 2,632,974

JUMP BITE TRAP

Dennis Cuvillier, Lake Arthur, La.

Application May 17, 1950, Serial No. 162,467

3 Claims. (Cl. 43—92)

This invention relates to an animal trap.

The object of the invention is to provide an animal trap which is provided with a novel and safe setting mechanism, the trap being constructed so that the animal will be positively retained in the trap when the jaws of the trap are sprung.

Another object of the invention is to provide a trap that will spring or jump into the air when the trap is tripped, thereby increasing the chances of securing a good hold on the animal that trips the device.

Still another object of the invention is to provide an animal trap that can be set without danger to the person handling the trap, thereby eliminating the chance of the trapper becoming injured as a result of accidental tripping of the trap.

A further object of the invention is to provide an animal trap which is extremely simple and inexpensive to manufacture.

Other objects and advantages will be apparent during the course of the following description.

In the accompanying drawings forming a part of this application, and in which like numerals are used to designate like parts throughout the same:

Figure 4:
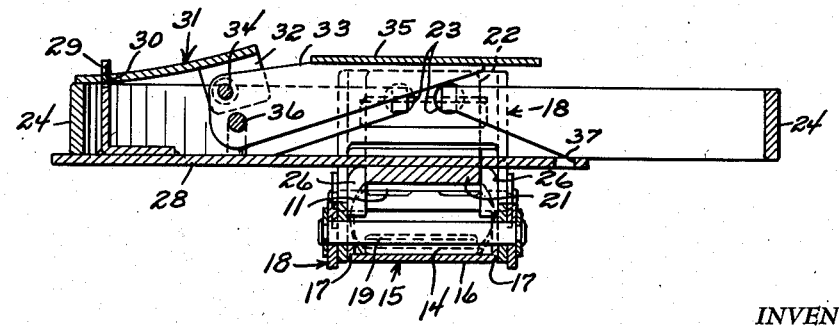
Figure 4 is a sectional view taken on the line 4—4 of Figure 3.

Referring in detail to the drawings, the numeral 10 designates a base which includes a pair of horizontally disposed top members 11 and a pair of downwardly converging spring legs 12 and 14, which are preferably made of a resilient metal. The free ends or lower ends of the legs 12 and 14 are arranged in engagement with a bracket 15, and the bracket 15 includes a bottom 16, Figure 4, and a pair of spaced, parallel side walls 17.

Figure 1:
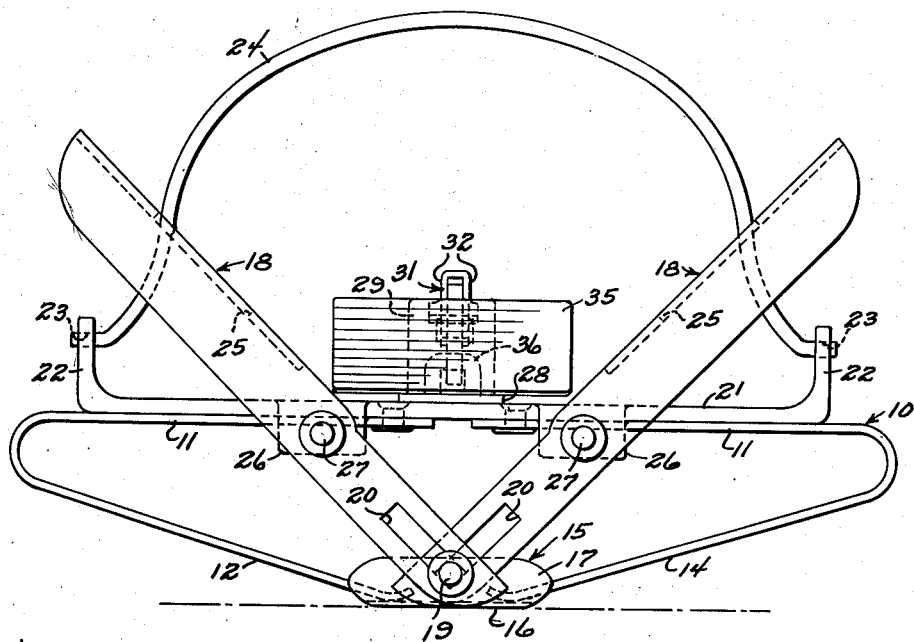
Figure 1 is a side elevational view showing the trap of the present invention in a tripped or sprung position.

Pivotally connected to the side walls 17 of the bracket 15 is a pair of arms or leaders 18. Thus, each of the arms 18 is provided with a slot 20 adjacent its lower end, Figure 1, and a pin or bolt-and-nut assembly 19 extends through the slot 20 and through the side walls 17 of the bracket 15 to provide a pivotal connection between the arms 18 and bracket 15.

Extending along the upper surfaces of the top members 11 and secured thereto, as by welding, is a body member 21. The body member 21 is provided with a pair of upstanding, spaced, parallel lugs 22, and each of the lugs 22 is provided with a pair of openings or holes 23 therein. A pair of jaws 24 are provided, and the jaws 24 are mounted for movement toward and away from each other, the free ends of the jaws 24 being positioned in the openings 23 in the lugs 22, whereby a pivotal connection between the jaws 24 and the lugs 22 is provided. Thus, the jaws 24 can move from the position shown in Figure 3 to the position shown in Figure 1, when the trap is sprung by an animal.

Figure 3:
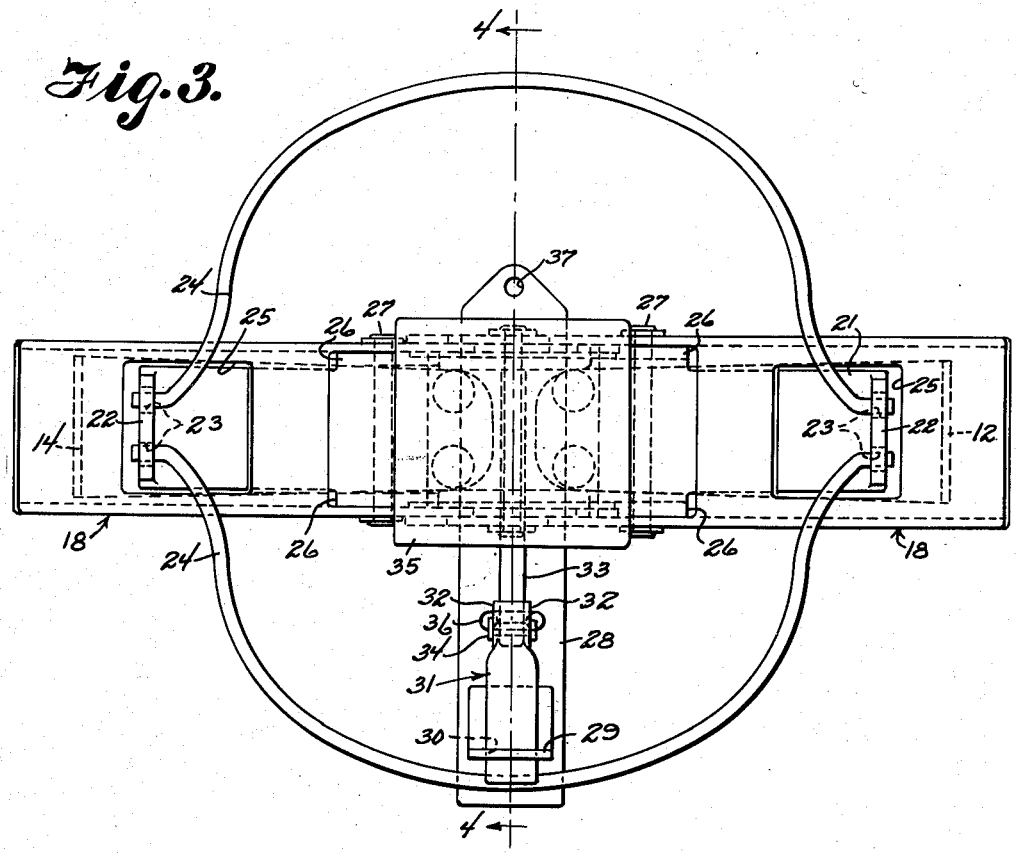
Figure 3 is a top plan view of the trap of the present invention, and with the parts in the positions illustrated in Figure 2.

Each of the arms 18 is provided with a rectangularly shaped cutout or opening 25, Figure 3, and the jaws 24 project through the openings 25 in the arms 18. Ears 26 are secured to the body member 21, and a pin or bolt-and-nut assembly 27 serves to pivotally connect each of the arms 18 to the respective ears 26, the pins 27 providing a pivotal connection between the arms 18 and body member 21.

Arranged at right angles with respect to the body member 21 and secured thereto, as by welding, is a support member 28. The support member 28 provides, or serves as, a support for a trigger mechanism, whereby the jaws 24 will be maintained in their open or set position, as shown in Figure 3, until the animal trips or causes the trap to be sprung. The trigger mechanism includes an L-shaped guide flange 29 which is provided with an opening 30 adjacent its upper end, Figure 4. A trigger 31 slidably projects through the opening 30, and the free end of the trigger 31 is adapted to selectively abut the upper edge of one of the jaws 24 for at times maintaining the jaws 24 in their set position. The trigger 31 includes a pair of spaced parallel side portions 32 which are pivotally connected to one end of a link 33 by means of a pin 34. Secured to the upper surface of the link 33 is a treadle or plate 35, and when the animal, such as the mink, coon or otter, steps on the treadle 35, the trigger 31 will be retracted sufficiently so as to enable the spring legs 12 and 14 to close the jaws 24 about the animal and also cause the trap to jump or spring into the air. The link 33 is pivotally connected to the support member 28 by means of a suitable pin 36. One end of the support member 28 is provided with an opening 37, whereby a suitable cord or cable can be attached to the trap by being trained through the opening 37 so as to prevent accidental loss of the trap.

Figure 2:
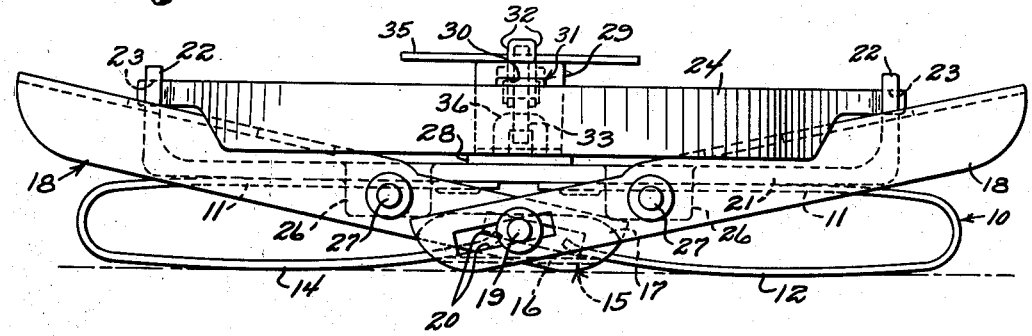
Figure 2 is a side elevational view showing the trap of the present invention in a set position.

In use, when the trap is set, the parts are in the position shown in Figure 3. Thus, the jaws 24 are maintained in their open position by means of the trigger 31, the trigger 31 projecting through the opening 30 and engaging the upper surface of one of the jaws 24. Then, when the animal steps on the treadle or plate 35, the link 33 will be pivoted in a clockwise direction, Figure 4, and this will cause the trigger 31 to be retracted sufficiently so that the jaws 24 will be sprung together by means of the pivotal connection of the arms 18 to the jaws 24 and to the bracket 17 and body member 21. Thus, the jaws 24 will be quickly snapped about a portion of the animal so that the animal will be prevented from escaping from the trap. Simultaneously, the entire trap will be forced into the air so as to insure a firm grip on the animal. This upward movement of the entire trap is caused by the movement of the spring legs 12 and 14 which move from the position shown in Figure 2 to the position shown in Figure 1, whereby the trap will be thrust upwardly from the ground. To reset the trap, after the animal has been removed therefrom, the trapper merely grips the upper ends of the pair of arms 18 and moves the arms 18 from the position shown in Figure 1 to the position shown in Figures 2 and 3. This downward movement of the arms 18 causes the jaws 24 to be moved to their open position and then by merely shaking the trap slightly, the trigger 31 will move sufficiently so that it engages the upper edge of the proper jaw 24, whereby the jaws 24 will be maintained in their open position.

The trap of the present invention can be used for trapping all sorts of small animals, such as mink, coon, otter and the like. The trap, when sprung by the animal, jumps into the air before the jaws are fully closed, so that the possibility of the animal escaping from the trap will be precluded. Also, the trap of the present invention can be safely set by the user. The arms 18 are merely pressed down by the user's hand and then the trap is shaken slightly so that the trigger engages the proper jaw. The trap can then be set without the necessity of using the hand to engage the trigger, and furthermore, it is not necessary for the trapper to insert his hand within the jaws at any time during the cocking or setting process. Also, the trap of the present invention has a compact construction and is small and light in weight.

I claim:

1. In an animal trap, a base including a pair of horizontally disposed top members, a downwardly converging spring leg formed integral at one end with the outer end of each of said members, means connecting the legs at their opposite ends, a body member extending along the upper surfaces of said top members and secured thereto, a pair of arms pivotally connected to said body member in spaced relation to each other intermediate of the ends of each of said arms and to each other at one end of each of said arms and to the means for connecting said legs, a pair of jaws mounted for movement toward and away from each other and pivotally connected to said body member, a trigger for maintaining said jaws in their open position, a treadle for actuating said trigger, and said arms coacting with said jaws so that when said trigger is actuated said spring legs will actuate said arms to cause jaws to move to a trapping position.

2. In an animal trap, a base including horizontally disposed top members, a body member extending along the upper surfaces of said top members and secured thereto, said top members being provided with legs made of spring metal, a pair of arms pivotally connected intermediate of their ends to said body member and at similar ends to said base, a pair of jaws mounted for movement toward and away from each other and pivotally connected to said body member, a trigger for maintaining said jaws in their open position, a treadle for actuating said trigger, and said legs coacting with said jaws so that upon the actuation of said trigger said spring legs will cause said arms to move said jaws into a trapping position.

3. In a trap, a base comprising top members and a pair of downwardly converging spring legs having lower free ends, a bracket arranged in engagement with the lower free ends of said legs, a pair of arms each having an end pivotally connected to said bracket, there being a slot arranged in each of said arms, a body member secured to the upper surface of the top members of said base and provided with a pair of upstanding lugs, a pair of jaws mounted for movement toward and away from each other and having their ends pivotally connected to said lugs, the said arms being pivotally secured to the body member inwardly of said legs, a support member arranged at right angles with respect to said body member and secured thereto, a trigger mechanism operatively connected to said support member for maintaining said jaws in their open position, and said jaws extending through the slots in said arms so that when said trigger mechanism is actuated said arms will move said jaws into trapping position.

his
DENNIS X CUVILLIER.
mark

Witnesses to mark:
MAE DILBECK,
H. F. GUILBEAN.

REFERENCES CITED

The following references are of record in the file of this patent:

UNITED STATES PATENTS

| Number | Name | Date |
|---|---|---|
| 2,450,536 | Whitbread | Oct. 5, 1948 |
| 2,489,095 | Lienhard | Nov. 22, 1949 |